United States Patent
Sugiura et al.

(10) Patent No.: US 9,728,808 B2
(45) Date of Patent: Aug. 8, 2017

(54) ALL SOLID STATE BATTERY

(71) Applicant: TOYOTA JIDOSHA KABUSHIKI KAISHA, Toyota-shi, Aichi-ken (JP)

(72) Inventors: Koichi Sugiura, Susono (JP); Satoshi Yoshida, Susono (JP); Hisataka Fujimaki, Nisshin (JP); Yuki Matsushita, Atsugi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 37 days.

(21) Appl. No.: 15/010,462

(22) Filed: Jan. 29, 2016

(65) Prior Publication Data
US 2016/0248093 A1 Aug. 25, 2016

(30) Foreign Application Priority Data

Feb. 25, 2015 (JP) .................................. 2015-034927
Oct. 20, 2015 (JP) .................................. 2015-206295

(51) Int. Cl.
*H01M 10/0562* (2010.01)
*H01M 10/052* (2010.01)

(52) U.S. Cl.
CPC ..... *H01M 10/0562* (2013.01); *H01M 10/052* (2013.01); *Y02T 10/7011* (2013.01)

(58) Field of Classification Search
CPC ............ H01M 10/0562; H01M 10/052; Y02T 10/7011
See application file for complete search history.

(56) References Cited

U.S. PATENT DOCUMENTS

| 2002/0018939 A1 | 2/2002 | Kugai et al. |
| 2013/0260258 A1* | 10/2013 | Tsuchida .............. H01M 4/131 429/304 |
| 2014/0141341 A1 | 5/2014 | Ohtomo et al. |

FOREIGN PATENT DOCUMENTS

| JP | 2001351615 A | 12/2001 |
| JP | 2013-016423 A | 1/2013 |
| JP | 2014-130733 A | 7/2014 |
| JP | 2014-216131 A | 11/2014 |

* cited by examiner

Primary Examiner — Cynthia K Walls
(74) Attorney, Agent, or Firm — Oliff PLC

(57) ABSTRACT

The main object of the present invention is to provide an all solid state battery in which compatibility between battery performance and safety is intended. The present invention attains the object by providing an all solid state battery comprising a cathode layer containing a cathode active material, an anode layer containing an anode active material, and a solid electrolyte layer formed between the cathode layer and the anode layer, containing a first sulfide solid electrolyte material, characterized in that a ratio of ion resistance of the whole all solid state battery to ion resistance of the solid electrolyte layer is 3.8 or less, and the ion resistance of the solid electrolyte layer is 7.6 $\Omega \cdot cm^2$ or more and 16 $\Omega \cdot cm^2$ or less.

4 Claims, 3 Drawing Sheets

EXAMPLE 1

EXAMPLE 3

COMPARATIVE EXAMPLE 1

ALL SOLID STATE BATTERY

TECHNICAL FIELD

The present invention relates to an all solid state battery in which compatibility between battery performance and safety is intended.

BACKGROUND ART

In accordance with a rapid spread of information relevant apparatuses and communication apparatuses such as a personal computer, a video camera and a portable telephone in recent years, the development of a battery excellent as a power source thereof has been emphasized. Also, in the field except information relevant apparatuses and communication relevant apparatuses, the development of a lithium ion battery has been advanced as a battery to be used for an electric automobile and a hybrid automobile in the automobile industry, for example.

Liquid electrolyte containing a flammable organic solvent is used for a presently commercialized lithium battery, so that the installation of a safety device for restraining temperature rise during a short circuit and the structure for preventing the short circuit are necessary therefor. In contrast, a lithium battery all-solidified by replacing the liquid electrolyte with a solid electrolyte layer is conceived to intend the simplification of the safety device and be excellent in production cost and productivity for the reason that the flammable organic solvent is not used in the battery. In addition, among all solid state batteries, an all solid state battery using a sulfide solid electrolyte material has the advantage that Li ion conductivity is excellent.

For example, in Patent Literature 1, a solid state battery using a sulfide solid electrolyte material of glass ceramics obtained by mixing and heating sulfides such as $Li_2S$ and $P_2S_5$ and LiI is disclosed.

Also, in Patent Literature 2, a technique for improving cycling characteristics of a battery by forming a two-layer solid electrolyte layer with different materials is disclosed as a technique for improving battery performance of a solid state battery. In addition, in Patent Literature 3, a technique for improving interlaminar adhesion properties of a battery by laminating a cathode layer, a crystalline crystal electrolyte layer, a glassy glass electrolyte layer and an anode layer in this order is disclosed.

CITATION LIST

Patent Literature

Patent Literature 1: Japanese Patent Application Publication (JP-A) No. 2014-130733
Patent Literature 2: JP-A No. 2001-351615
Patent Literature 3: JP-A No. 2014-216131

SUMMARY OF INVENTION

Technical Problem

It is known that an all solid state battery is high in safety for the reason that a liquid electrolyte containing a flammable organic solvent is not used. However, even in an all solid state battery, the performance of a severe test such as a nail penetration test occasionally causes the battery (for example, resin of an exterior body of the laminate) to fume due to Joule heating. On the other hand, the increase of ion resistance of the battery for inhibiting Joule heating causes battery performance to deteriorate. Accordingly, in an all solid state battery, the problem is that compatibility between battery performance and safety is intended with difficulty.

The present invention has been made in view of the actual circumstances, and the main object thereof is to provide an all solid state battery in which compatibility between battery performance and safety is intended.

Solution to Problem

In order to achieve the object, the present invention provides an all solid state battery comprising a cathode layer containing a cathode active material, an anode layer containing an anode active material, and a solid electrolyte layer formed between the cathode layer and the anode layer, containing a first sulfide solid electrolyte material, in which a ratio of ion resistance of the whole all solid state battery to ion resistance of the solid electrolyte layer is 3.8 or less, and the ion resistance of the solid electrolyte layer is 7.6 $\Omega \cdot cm^2$ or more and 16 $\Omega \cdot cm^2$ or less.

According to the present invention, a relation between the ion resistance of the solid electrolyte layer and the ion resistance of the whole all solid state battery allows the all solid state battery in which compatibility between battery performance and safety is intended.

In the invention, at least one of the cathode layer and the anode layer preferably further contains a second sulfide solid electrolyte material.

In the invention, the first sulfide solid electrolyte material and the second sulfide solid electrolyte material are preferably different materials.

In the invention, an ion conductance of the second sulfide solid electrolyte material is preferably larger than an ion conductance of the first sulfide solid electrolyte material.

Advantageous Effects of Invention

The all solid state battery of the present invention produces the effect such as to allow compatibility between battery performance and safety to be intended.

DESCRIPTION OF EMBODIMENTS

An all solid state battery of the present invention is hereinafter described in detail.

Figure 1:
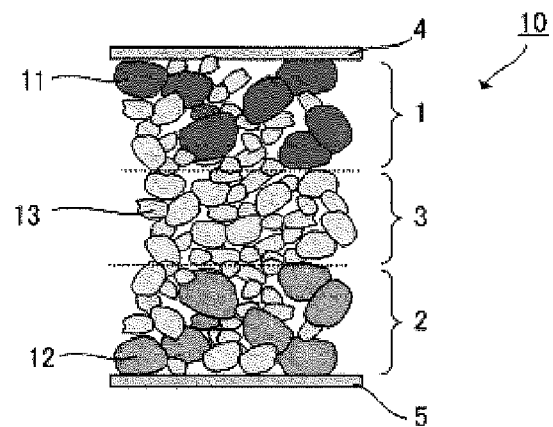
FIG. 1 is a schematic cross-sectional view showing an example of an all solid state battery of the present invention.

FIG. 1 is a schematic cross-sectional view showing an example of the all solid state battery of the present invention. An all solid state battery 10 shown in FIG. 1 comprises a cathode layer 1 containing a cathode active material 11, an anode layer 2 containing an anode active material 12, and a solid electrolyte layer 3 formed between the cathode layer 1 and the anode layer 2, containing a sulfide solid electrolyte material 13. Also, the all solid state battery 10 ordinarily comprises a cathode current collector 4 for collecting the cathode layer 1 and an anode current collector 5 for collecting the anode layer 2. Also, the all solid state battery 10 has the characteristics that a ratio of ion resistance of the whole all solid state battery 10 to ion resistance of the solid electrolyte layer 3 is 3.8 or less, and the ion resistance of the solid electrolyte layer 3 is 7.6 Ω·cm² or more and 16 Ω·cm² or less.

According to the present invention, a relation between the ion resistance of the solid electrolyte layer and the ion resistance of the whole all solid state battery allows the all solid state battery in which compatibility between battery performance and safety is intended.

The all solid state battery has been conventionally recognized to be safer than a liquid-based battery. On the other hand, in the case where internal resistance of the battery lowers and the battery has higher performance, occasionally stability of the all solid state battery is not necessarily high. A nail penetration test is known as the severest test of safety tests; for example, in the case where a nail penetration test is performed for the high-performance all solid state battery in a state of full charge, the nail ambient temperature exceeds 250° C. due to Joule heating and the battery (for example, resin of an exterior body of the laminate) fumes occasionally.

Joule heating is heating generated in electrifying a conductor and represented by the following formula.

$$Q=I*V \cdot t=V/R \cdot V \cdot t=V^2/R \cdot t$$

(In the formula, Q is Joule heating (J), I is current (A), V is voltage (V), R is resistance (Ω) and t is in second.)

Joule heating is determined by flow rate of electrons (=ions) (current) and voltage, and temperature actually increments in a battery is determined by the Joule heating and heat capacity. The current is calculated from voltage/resistance (ion resistance). That is to say, it is desired for inhibiting Joule heating that ion resistance of the all solid state battery is increased. On the other hand, the problem is that the increase of ion resistance of the all solid state battery causes battery performance (capacity performance and output performance) to deteriorate. Accordingly, in the all solid state battery, the problem is that compatibility between battery performance and safety is intended with difficulty.

Through earnest studies for intending compatibility between battery performance and safety, the inventors of the present invention have completed the present invention by noticing a balance between ion resistance of the solid electrolyte layer and ion resistance of the whole all solid state battery to thereby intend compatibility between both of them.

Examples of a factor of ion resistance in the all solid state battery include three factors of ion resistance of the solid electrolyte layer (direct current resistance), ion resistance between the solid electrolyte layer and an electrode layer (a cathode layer or an anode layer) (interface resistance), and ion resistance of the electrode layer (diffusion resistance). Among them, the interface resistance and the diffusion resistance depend greatly on SOC (State of charge) and discharge rate of the all solid state battery. In contrast, the ion resistance of the solid electrolyte layer depends on SOC and discharge rate so less as compared with other factors as to become resistance for stably inhibiting Joule heating even under high SOC and high discharge rate of the all solid state battery. In the present invention, the ion resistance of the solid electrolyte layer is intentionally increased (7.6 Ω·cm² or more), and a ratio of the ion resistance is raised, so as to allow the all solid state battery with high safety.

Incidentally, the all solid state battery has been conventionally recognized to be safer than a liquid-based battery. Also, generally, the all solid state battery is low in battery performance as compared with a liquid-based battery. Thus, the present situation is such that studies on safety of the all solid state battery are not sufficiently made. On the other hand, battery performance of the all solid state battery has been improved day by day, so that studies on safety are required.

The constitution of the all solid state battery of the present invention is hereinafter described.

1. Ratio of Ion Resistance

The all solid state battery of the present invention has the characteristic that a ratio of ion resistance (B) of the whole all solid state battery to ion resistance (A) of the solid electrolyte layer, namely, B/A is 3.8 or less. B/A may be 3.8 or less, preferably 3.0 or less, more preferably 1.9 or less. Also, B/A is 1.25 or more, for example. The reason therefor is that too large B/A brings a possibility that it is difficult to sufficiently secure safety.

The ion resistance of the solid electrolyte layer may be measured as direct current resistance by an alternating current impedance method. Also, the ion resistance of the whole all solid state battery is the sum of the ion resistance of the solid electrolyte layer, reaction resistance and diffusion resistance, and may be measured by DC-IR measurement. The resistance value obtained by DC-IR measurement is a value including both of ion resistance and electronic resistance, but it can be regarded as ion resistance value because the ratio of electronic resistance is normally extremely small (about 1%).

The B/A is a value on the basis of the ion resistance of the solid electrolyte layer, and A/B as a reciprocal number thereof is a value on the basis of the ion resistance of the whole all solid state battery. A/B may be 0.26 or more, more preferably 0.33 or more, further preferably 0.53 or more. Also, A/B is 0.8 or less, for example.

The ion resistance (A) of the solid electrolyte layer is ordinarily 7.6 Ω·cm² or more. Also, the ion resistance of the solid electrolyte layer is ordinarily 16 Ω·cm² or less. The ion resistance (B) of the whole all solid state battery is, for example, 10 Ω·cm² or more and may be 15 Ω·cm² or more. Also, the ion resistance (B) of the whole all solid state battery is, for example, 40 Ω·cm² or less, preferably 20 Ω·cm² or less.

Incidentally, the difference (B−A) between the ion resistance (B) of the whole all solid state battery and the ion resistance (A) of the solid electrolyte layer corresponds to the total of interface resistance (reaction resistance) and diffusion resistance.

In the all solid state battery of the present invention, ion resistance in each layer is adjusted so that A and B have the relation described above. The ion resistance in each layer may be adjusted by the selection of kind (composition and physical properties) and ratio of a sulfide solid electrolyte material and thickness of each layer.

2. Solid Electrolyte Layer

The solid electrolyte layer in the present invention is formed between the cathode layer and the anode layer, and contains a first sulfide solid electrolyte material. The sulfide solid electrolyte material contained in the solid electrolyte layer is referred as the first sulfide solid electrolyte material for descriptive purposes.

Examples of the sulfide solid electrolyte material include $Li_2S—P_2S_5$, $Li_2S—P_2S_5—LiI$, $Li_2S—P_2S_5\text{-}Li_2O$, $Li_2S—$ $P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (m and n are positive numbers, Z is any of Ge, Zn and Ga.), $Li_2S$—$GeS_2$, $Li_2S$—$SiS_2$—$Li_3PO_4$, and $Li_2S$—$SiS_2$-$Li_x$-$MO_y$ (x and y are positive numbers, M is any of P, Si, Ge, B, Al, Ga and In). Incidentally, the description of the "$Li_2S$—$P_2S_5$" signifies the sulfide solid electrolyte material obtained by using a raw material composition containing $Li_2S$ and $P_2S_5$, and the same is also applicable to other descriptions. In particular, the first sulfide solid electrolyte material is preferably a material having $Li_2S$—$P_2S_5$ as the main component. In addition, the first sulfide solid electrolyte material preferably contains halogen (F, Cl, Br and I).

Also, in the case where the sulfide solid electrolyte material is of an $Li_2S$—$P_2S_5$ base, the ratio of $Li_2S$ and $P_2S_5$ is preferably at molar ratio within a range of $Li_2S:P_2S_5$=50:50 to 100:0, above all, preferably within a range of $Li_2S$:$P_2S_5$=70:30 to 80:20.

Also, the sulfide solid electrolyte material may be sulfide glass, crystallized sulfide glass, or a crystalline material obtained by a solid phase method. Incidentally, the sulfide glass may be obtained by performing mechanical milling (such as ball mill) for a raw material composition, for example. Also, the crystallized sulfide glass may be obtained by heat-treating the sulfide glass at a temperature of crystallization temperature or higher, for example. Also, Li ion conductance at normal temperature (25° C.) of the sulfide solid electrolyte material is, for example, preferably $1 \times 10^{-5}$ S/cm or more, more preferably $1 \times 10^{-4}$ S/cm or more. Li ion conductance may be measured by an alternating current impedance method.

Examples of the shape of the sulfide solid electrolyte material in the present invention include a particulate shape such as a perfectly spherical shape and an elliptically spherical shape, and a thin-film shape. In the case where the sulfide solid electrolyte material is in the particulate shape, the average particle diameter ($D_{50}$) thereof is not particularly limited but preferably 40 μm or less, more preferably 20 μm or less, and further preferably 10 μm or less. The reason therefor is to easily intend to improve filling factor in the cathode layer. On the other hand, the average particle diameter is preferably 0.01 μm or more, more preferably 0.1 μm or more. Incidentally, the average particle diameter may be determined by a granulometer, for example.

The content of the sulfide solid electrolyte material in the solid electrolyte layer is, for example, preferably within a range of 10% by weight to 100% by weight, more preferably within a range of 50% by weight to 100% by weight.

The solid electrolyte layer may contain as required fluorine-containing binders such as acrylate butadiene rubber (ABR), polyvinylidene fluoride (PVdF) and polytetrafluoroethylene (PTFE) other than the materials described above. The thickness of the solid electrolyte layer is, for example, preferably within a range of 0.1 μm to 1000 μm, more preferably within a range of 0.1 μm to 300 μm.

3. Cathode Layer

The cathode layer in the present invention is a layer containing at least the cathode active material, and may contain at least one of a solid electrolyte material, a conductive material and a binder as required.

Kinds of the cathode active material are properly selected in accordance with kinds of the all solid state battery, and examples thereof include an oxide active material and a sulfide active material. Examples of the oxide active material include rock salt bed type active materials such as $LiCoO_2$, $LiMnO_2$, $LiNiO_2$, $LiVO_2$ and $LiNi_{1/3}Co_{1/3}Mn_{1/3}O_2$, spinel type active materials such as $LiMn_2O_4$ and $LiNi_{0.5}Mn_{1.5}O_4$, olivine type active materials such as $LiFePO_4$ and $LiMnPO_4$, and Si-containing active materials such as $Li_2FeSiO_4$ and $Li_2MnSiO_4$. Also, examples of the oxide active material except the above include $Li_4Ti_5O_{12}$.

Examples of the shape of the cathode active material include a particulate shape and a thin-film shape. In the case where the cathode active material is in a particulate shape, the average particle diameter thereof ($D_{50}$) is, for example, preferably within a range of 1 nm to 100 μm, above all, preferably within a range of 10 nm to 30 μm. The reason therefor is that too small average particle diameter of the cathode active material brings a possibility of deteriorating handleability, whereas too large average particle diameter thereof occasionally allows the flat cathode layer with difficulty.

The content of the cathode active material in the cathode layer is not particularly limited but is, for example, preferably within a range of 40% by weight to 99% by weight.

The cathode layer preferably contains a second sulfide solid electrolyte material except the cathode active material. The sulfide solid electrolyte material contained in the electrode layer is referred as the second sulfide solid electrolyte material for descriptive purposes. Specific examples of the second sulfide solid electrolyte material are the same as the first sulfide solid electrolyte material described above; therefore, the description herein is omitted. In the present invention, the first sulfide solid electrolyte material and the second sulfide solid electrolyte material may be the same materials or different materials.

Here, "different materials" refer to at least any case of the case where chemical characteristics differ, the case where physical characteristics differ and the case where physical properties differ. Examples of the case where chemical characteristics differ include the case of different compositions and the case of different crystallinity (amorphism). Examples of the case where physical characteristics differ include the case of different particle diameters and the case of different shapes. Examples of the case where physical properties differ include the case of different ion conductance. Incidentally, the difference of physical properties is ordinarily a difference caused for the reason that at least one of chemical characteristics and physical characteristics differs.

An ion conductance of the second sulfide solid electrolyte material is preferably larger than an ion conductance of the first sulfide solid electrolyte material. Specifically, the ratio of both (the ion conductance of the second sulfide solid electrolyte material/the ion conductance of the first sulfide solid electrolyte material) is preferably more than 1, and may be 1.1 or more, 1.5 or more, or 2 or more. Further, based on the results of Examples described later, the ratio of both may be 3.4 or more and 1.4 or more.

The content of the second sulfide solid electrolyte material in the cathode layer used for the present invention is, for example, preferably within a range of 1% by weight to 90% by weight, more preferably within a range of 10% by weight to 80% by weight.

The cathode layer in the present invention may further contain at least one of a conductive material and a binder other than the cathode active material and second solid electrolyte material described above. Examples of the conductive material include acetylene black, Ketjen Black and carbon fiber (VGCF). Examples of the binder include fluorine-containing binders such as polyvinylidene fluoride (PVdF) and polytetrafluorethylene (PTFE). The thickness of the cathode layer varies with the constitution of an intended all solid state battery, and is preferably within a range of 0.1 µm to 1000 µm, for example.

4. Anode Layer

The anode layer in the present invention is a layer containing at least the anode active material, and may contain at least one of a solid electrolyte material, a conductive material and a binder as required.

Examples of the anode active material include a metal active material and a carbon active material. Examples of the metal active material include In, Al, Si and Sn. On the other hand, examples of the carbon active material include meso-carbon microbeads (MCMB), high orientation property graphite (HOPG), hard carbon and soft carbon.

The anode layer preferably contains a second sulfide solid electrolyte material except the anode active material. The second sulfide solid electrolyte material is the same as the contents described above. Also, the second sulfide solid electrolyte material contained in the anode layer and the second sulfide solid electrolyte material contained in the cathode layer may be the same materials or different materials.

Incidentally, the conductive material and the binder used for the anode layer are the same as the case in the cathode layer described above. Also, the thickness of the anode layer is preferably within a range of 0.1 µm to 1000 µm, for example.

5. Other Constitutions

Also, the all solid state battery obtained by the present invention comprises at least the cathode layer, anode layer and solid electrolyte layer, ordinarily further comprising a cathode current collector for collecting the cathode active material and an anode current collector for collecting the anode active material. Examples of a material for the cathode current collector include SUS, aluminum, nickel, iron, titanium and carbon. On the other hand, examples of a material for the anode current collector include SUS, copper, nickel and carbon. Also, factors such as the thickness and shape of the cathode current collector and the anode current collector are preferably selected properly in accordance with uses of the all solid state battery and the like. Also, a battery case used for a general all solid state battery may be used for a battery case used in the present invention, and examples thereof include a battery case made of SUS. Also, the all solid state battery obtained by the present invention may be such that a power generating element is formed inside an insulating ring, or a power generating element is sealed by an exterior body. An exterior body used for a general battery may be used as the exterior body, and examples thereof include an aluminum laminate film. Also, the all solid state battery may be a single-layer battery or a laminate battery in which plural single-layer batteries are laminated.

6. All Solid State Battery

The all solid state battery (the all solid lithium battery) obtained by the present invention may be a primary battery or a secondary battery, preferably a secondary battery among them. The reason therefor is to be repeatedly charged and discharged and be useful as a car-mounted battery, for example. In the case where the all solid state battery obtained by the present invention is used as a car-mounted battery, examples of a vehicle as an object include an electric automobile mounted with a battery and no engine, and a hybrid automobile mounted with both a battery and an engine. Examples of the shape of the all solid state battery obtained by the present invention include a coin shape, a laminate shape, a cylindrical shape and a rectangular shape.

The safety of the all solid state battery of the present invention may be evaluated by a nail penetration test, for example. The nail penetration test is ordinarily performed in conformity to UL standard (UL1642) or JIS B8714. Specifically, the nail penetration test may be performed by using a commercially available nail penetration tester.

The environmental temperature of the nail penetration test is 25° C. as regulatory requirements, and may be determined within a range of 25° C. to 80° C., for example. A material for a nail used for the nail penetration test is not particularly limited but examples thereof include SK material (steel product of carbon tool steel), SUS (stainless steel) and other metal materials.

Temperature increment quantity (K) by the nail penetration test is, for example, preferably 100 K or less, more preferably 60 K or less. The reason therefor is to allow fuming due to Joule heating to be appropriately inhibited. Incidentally, the temperature increment quantity (K) is a value obtained by subtracting an environmental temperature (° C.) from a measured maximum temperature (° C.).

Incidentally, the present invention is not limited to the embodiments. The embodiments are exemplification, and any of them is included in the technical scope of the present invention if it has substantially the same constitution as the technical idea described in the claim of the present invention and offers similar operation and effect thereto.

EXAMPLES

The present invention is described more specifically with showing examples hereinafter.

Production Example 1

Production of Solid Electrolytes 1 to 4

(Synthesis of Sulfide Solid Electrolyte Material)

Lithium sulfide ($Li_2S$), diphosphorus pentasulfide ($P_2S_5$) and lithium iodide (LiI) were used as a starting material. Next, $Li_2S$ and $P_2S_5$ were weighed in a glove box under an Ar atmosphere (dew-point temperature: −70° C.) so as to be a molar ratio of $75Li_2S \cdot 25P_2S_5$ ($Li_3PS_4$, ortho-composition). Next, LiI was weighed so as to be 10 mol %. Projected into a vessel of planetary ball mill (45 cc, made of $ZrO_2$) was 2 g of this mixture, dehydrated heptane (a moisture amount of 30 ppm or less, 4 g) was projected thereinto, and a $ZrO_2$ ball (φ=5 mm, 53 g) was projected thereinto to hermetically seal the vessel completely (Ar atmosphere). This vessel was mounted on a planetary ball mill machine (P7™ manufactured by FRITSCH JAPAN CO., LTD.) to perform mechanical milling of 1-hour treatment and 15-minute pause forty times at the number of soleplate revolutions of 500 rpm. Thereafter, the obtained test sample was dried on a hot plate so as to remove the heptane to obtain a sulfide solid electrolyte material. The composition of the obtained sulfide solid electrolyte material was $10LiI \cdot 90(0.75Li_2S \cdot 0.25P_2S_5)$ (Atomization and Crystallization of Sulfide Solid Electrolyte Material)

The synthesized sulfide solid electrolyte material was atomized and crystallized by the following method to thereby obtain sulfide solid electrolyte materials (solid electrolytes 1 to 4) of the following Table 1 with different Li ion conductances and particle diameters.

The sulfide solid electrolyte material obtained by the synthesis step, dehydrated heptane (manufactured by KANTO CHEMICAL CO., INC.) and dibutyl ether were prepared so that a total weight thereof was 10 g and the ratio of the weight of the sulfide solid electrolyte material occupied in the total weight was a predetermined ratio. The sulfide solid electrolyte material, the dehydrated heptane, the dibutyl ether and 40 g of a $ZrO_2$ ball ($\phi$=0.3 mm, $\phi$=0.6 mm or $\phi$=1 mm) were projected into a 45-ml $ZrO_2$ pot, which was hermetically sealed completely (Ar atmosphere). This pot was mounted on a planetary ball mill machine (P7™ manufactured by FRITSCH JAPAN CO., LTD.) and subjected to wet mechanical milling for 10 to 20 hours at the number of rotary and revolutionary revolutions of 100 to 200 rpm to thereby grind and atomize the sulfide solid electrolyte material.

Disposed on a petri dish made of aluminum was 1 g of the atomized sulfide solid electrolyte material in atomization and retained on a hot plate heated to 180° C. over 2 hours to thereby crystallize the atomized sulfide solid electrolyte material.

[Evaluations]

(Measurement of Lithium Ion Conductance)

Li ion conductance of the obtained solid electrolytes 1 to 4 was measured. Specifically, pellets of 1 $cm^2$ with a thickness of 0.5 mm were produced by using the sulfide solid electrolyte material recovered after crystallization, and molded at 4.3 ton to thereafter measure lithium ion conductance (25° C.) for the pellets after molding by an alternating current impedance method. Incidentally, Solartron 1260™ was used for the measurement, and the measurement conditions were an impressed voltage of 5 mV and a measuring frequency band of 0.01 MHz to 1 MHz to read a resistance value of 100 kHz, which was corrected by thickness and converted into lithium ion conductance. The results are shown in Table 1.

(Measurement of Average Particle Diameter)

The average particle diameter of the obtained solid electrolytes 1 to 4 was measured. Specifically, the crystallized particulate solid electrolytes 1 to 4 were sampled by a small amount to perform particle-size distribution measurement by a laser scattering diffraction particle-size distribution measuring apparatus (microtrac MT 3300EXII™ manufactured by Nikkiso Co., Ltd.) and determine the average particle diameter ($D_{50}$). The results are shown in Table 1.

TABLE 1

|  | Li ION CONDUCTANCE $\sigma$ (mS/cm) | AVERAGE PARTICLE DIAMETER ($\mu$m) |
|---|---|---|
| SOLID ELECTROLYTE 1 | 2.7 | 0.8 |
| SOLID ELECTROLYTE 2 | 0.8 | 1.1 |
| SOLID ELECTROLYTE 3 | 0.2 | 1.2 |
| SOLID ELECTROLYTE 4 | 1.8 | 2.5 |

Production Example 2

Production of Laminate Battery (Production of Cathode Mixture Slurry)

A composition produced by dissolving equimolar $LiOC_2H_5$ and $Nb(OC_2H_5)_5$ in an ethanol solvent was spray-coated on the surface of $LiNi_{1/3}Co_{1/3}Mn_{1/3}O_2$ (manufactured by NICHIA CORPORATION) by using a tumbling flow layer coating apparatus (SFP-01™, manufactured by Powrex Corporation). Thereafter, the coated $LiNi_{1/3}Co_{1/3}Mn_{1/3}O_2$ was heat-treated at 350° C. under the atmospheric pressure over 1 hour to thereby form a layer of $LiNbO_3$ (coating layer) on the surface of $LiNi_{1/3}Co_{1/3}Mn_{1/3}O_2$ (active material) and produce a cathode active material. The average particle diameter ($D_{50}$) of the cathode active material was 5 $\mu$m. Weighed were 52 g of the obtained cathode active material, 17 g of the sulfide solid electrolyte material, 1 g of vapor growth carbon fiber (VGCF (registered trademark)) as a conductive material and 15 g of dehydrated heptane (manufactured by KANTO CHEMICAL CO., INC.), and sufficiently mixed to obtain cathode mixture slurry.

(Production of Anode Mixture Slurry)

Weighed were 36 g of graphite (manufactured by Mitsubishi Chemical Corporation) as an anode active material and 25 g of the sulfide solid electrolyte material, and sufficiently mixed to obtain anode mixture slurry.

(Production of all Solid State Battery)

The cathode mixture slurry and the anode mixture slurry were coated and dried on an Al foil (a cathode current collector) and a Cu foil (an anode current collector) with optional thickness respectively to obtain a cathode layer and an anode layer. Also, the obtained laminated body was cut to obtain a cathode and an anode.

The sulfide solid electrolyte material and a binder (ABR) were mixed at sulfide solid electrolyte material: ABR=98:2 (volume ratio). The mixture was pressed at 4.3 ton/$cm^2$ to obtain a sheet-like solid electrolyte layer. The solid electrolyte layer was transferred between the cathode and the anode, and pressed at 4.3 ton/$cm^2$ to produce a single-layer battery. Incidentally, pressure for pressing is preferably 2 tons or more ordinarily. The single-layer battery was laminated by eight layers to ultrasonic-weld a collection tab with a cell terminal of the single-layer battery. The outside of the laminated body was vacuum-sealed with an alumilaminate material to thereby obtain a laminate battery of 0.5 Ah class.

Examples 1 to 3, Comparative Examples 1 to 3

A laminate battery was produced by a combination as shown in the following Tables 2 and 3.

TABLE 2

|  |  | EXAMPLE 1 | EXAMPLE 2 | EXAMPLE 3 |
|---|---|---|---|---|
| CATHODE LAYER | CATHODE CURRENT COLLECTOR | Al FOIL | Al FOIL | Al FOIL |
|  | CATHODE ACTIVE MATERIAL | $LiNi_{0.33}Co_{0.33}Mn_{0.33}O_2$ | $LiNi_{0.33}Co_{0.33}Mn_{0.33}O_2$ | $LiNi_{0.33}Co_{0.33}Mn_{0.33}O_2$ |
|  | SOLID ELECTROLYTE | SOLID ELECTROLYTE 1 | SOLID ELECTROLYTE 2 | SOLID ELECTROLYTE 1 |
|  | BINDER | PVDF | PVDF | PVDF |
|  | CONDUCTIVE MATERIAL | VGCF | VGCF | VGCF |
| SOLID ELECTROLYTE LAYER | SOLID ELECTROLYTE | SOLID ELECTROLYTE 2 | SOLID ELECTROLYTE 2 | SOLID ELECTROLYTE 3 |
|  | BINDER | ABR | ABR | ABR |
| ANODE LAYER | ANODE ACTIVE MATERIAL | CARBON | CARBON | CARBON |
|  | SOLID ELECTROLYTE | SOLID ELECTROLYTE 1 | SOLID ELECTROLYTE 1 | SOLID ELECTROLYTE 1 |
|  | BINDER | PVDF | PVDF | PVDF |
|  | CONDUCTIVE MATERIAL | — | — | — |
|  | ANODE CURRENT COLLECTOR | Cu FOIL | Cu FOIL | Cu FOIL |

TABLE 3

|  |  | COMPARATIVE EXAMPLE 1 | COMPARATIVE EXAMPLE 2 | COMPARATIVE EXAMPLE 3 |
|---|---|---|---|---|
| CATHODE LAYER | CATHODE CURRENT COLLECTOR | Al FOIL | Al FOIL | Al FOIL |
|  | CATHODE ACTIVE MATERIAL | $LiNi_{0.33}Co_{0.33}Mn_{0.33}O_2$ | $LiNi_{0.33}Co_{0.33}Mn_{0.33}O_2$ | $LiNi_{0.33}Co_{0.33}Mn_{0.33}O_2$ |
|  | SOLID ELECTROLYTE | SOLID ELECTROLYTE 1 | SOLID ELECTROLYTE 2 | SOLID ELECTROLYTE 1 |
|  | BINDER | PVDF | PVDF | PVDF |
|  | CONDUCTIVE MATERIAL | VGCF | VGCF | VGCF |
| SOLID ELECTROLYTE LAYER | SOLID ELECTROLYTE | SOLID ELECTROLYTE 1 | SOLID ELECTROLYTE 4 | SOLID ELECTROLYTE 4 |
|  | BINDER | ABR | ABR | ABR |
| ANODE LAYER | ANODE ACTIVE MATERIAL | CARBON | CARBON | CARBON |
|  | SOLID ELECTROLYTE | SOLID ELECTROLYTE 1 | SOLID ELECTROLYTE 1 | SOLID ELECTROLYTE 1 |
|  | BINDER | PVDF | PVDF | PVDF |
|  | CONDUCTIVE MATERIAL | — | — | — |
|  | ANODE CURRENT COLLECTOR | Cu FOIL | Cu FOIL | Cu FOIL |

[Evaluations]

(Battery Capacity Evaluation)

With regard to the laminate batteries of Examples 1 to 3 and Comparative Examples 1 to 3, battery capacity was evaluated by the following conditions. The constant-current charge and constant-current discharge were performed. Also, 10 hour rating charge and discharge was performed and charge and discharge current was determined at 0.3046 mA. Also, charge termination voltage was determined at 4.55 V and discharge termination voltage was determined at 3.0 V.

(Battery Resistance Evaluation)

With regard to the laminate batteries of Examples 1 to 3 and Comparative Examples 1 to 3, constant-current constant-voltage charge was performed at a charge voltage of 3.6 V. The termination current was determined at 0.015 mA. Immediately after that, direct current resistance and reaction resistance were measured by an alternating current impedance method to regard the direct current resistance as ion resistance of the solid electrolyte layer. Also, the ion resistance of the whole all solid state battery was measured by DC-IR measurement. The results are shown in Table 4 and FIG. 2.

(Nail Penetration Test)

The laminate batteries of Examples 1 to 3 and Comparative Examples 1 to 3 were prepared in full charge. The laminate batteries were placed in a nail penetration tester at an environmental temperature 60° C. A nail was stuck into the center of the battery at a rate of 10 mm/sec by the nail penetration tester to observe the presence or absence of discharge behavior, heating temperature and fuming. Incidentally, in the case of sticking a nail at slow rate in the nail penetration test, current flowing around is easily caused.

A position 7 mm above the nail penetration portion was measured for temperature measurement. Also, temperature increment quantity (K) was calculated by subtracting an environmental temperature (° C.) from a measured maximum temperature (° C.).

As Comparative Example 4, the same laminate battery as Comparative Example 1 was prepared in full charge to perform a nail penetration test similarly at an environmental temperature 25° C. The results are shown in Table 4 and FIGS. 3 and 4.

TABLE 4

|  | | | | NAIL PENETRATION TEST | | |
|---|---|---|---|---|---|---|
|  | A ($\Omega \cdot cm^2$) | B ($\Omega \cdot cm^2$) | B/A | ENVIRONMENTAL TEMPERATURE (° C.) | RESULT | TEMPERATURE INCREMENT QUANTITY (K) |
| EXAMPLE 1 | 7.6 | 23 | 3.0 | 60 | HEATING ONLY | 95 |
| EXAMPLE 2 | 8.1 | 31 | 3.8 | 60 | HEATING ONLY | 88 |
| EXAMPLE 3 | 16.0 | 30 | 1.9 | 60 | HEATING ONLY | 60 |
| COMPARATIVE EXAMPLE 1 | 1.8 | 19 | 10.6 | 60 | FUMING | 206 |
| COMPARATIVE EXAMPLE 2 | 2.5 | 28 | 11.2 | 60 | FUMING | 165 |
| COMPARATIVE EXAMPLE 3 | 3.0 | 21 | 7.0 | 60 | FUMING | 179 |
| COMPARATIVE EXAMPLE 4 | 1.8 | 19 | 10.6 | 25 (REGULATORY REQUIREMENTS) | FUMING | 160 |

A: ION RESISTANCE OF SOLID ELECTROLYTE LAYER
B: ALL ION RESISTANCE OF LAMINATE BATTERY

Figure 2:
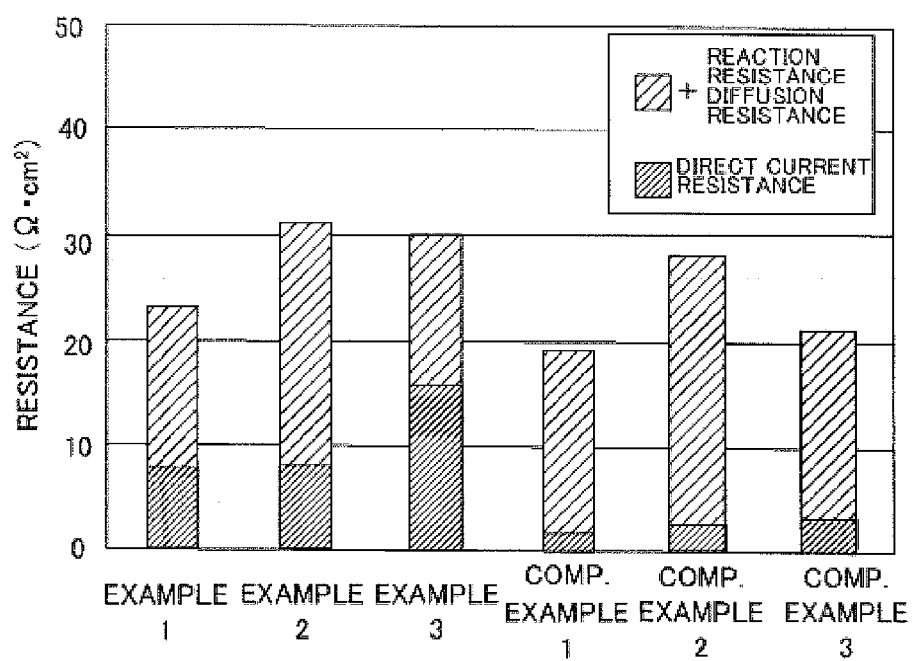
FIG. 2 is a graph showing ion resistance, reaction resistance and diffusion resistance of a solid electrolyte layer of an all solid state battery each obtained in Examples 1 to 3 and Comparative Examples 1 to 3.

As shown in Table 4 and FIG. 2, the whole resistances (ion resistance in the whole all solid state battery) in Examples 1 to 3 were at similar level as those in Comparative Examples 1 to 3. Accordingly, it was suggested that the laminate batteries obtained in Examples 1 to 3 showed the identifying battery performance to the laminate batteries obtained in Comparative Examples 1 to 3. On the other hand, the ratio of direct current resistances (ion resistance in the solid electrolyte layer) in Examples 1 to 3 are larger compare to those in Comparative Examples 1 to 3.

Figure 3A:
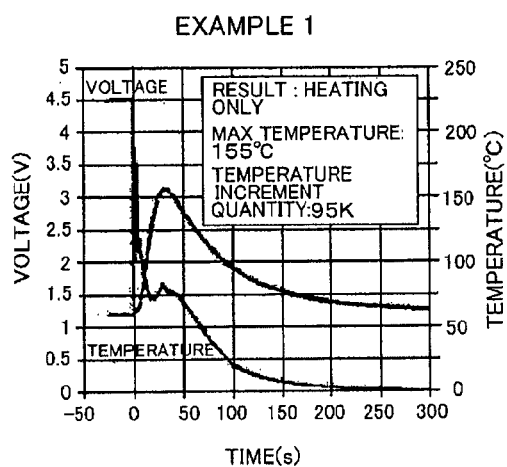
FIGS. 3A to 3C are graphs showing discharge behavior and temperature change by a nail penetration test of Examples 1 and 3 and Comparative Examples 1 and 2.
Figure 3B:
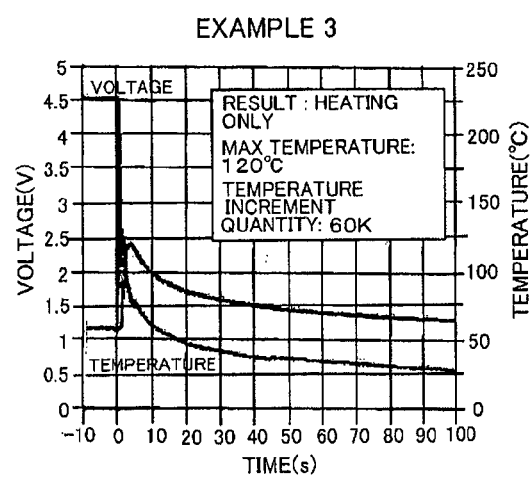
Figure 3C:
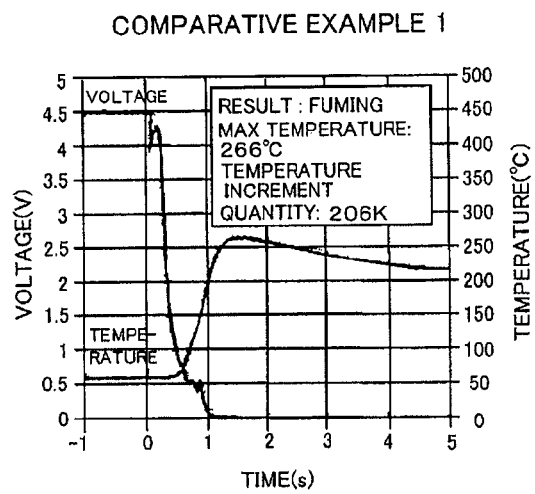
Figure 4:
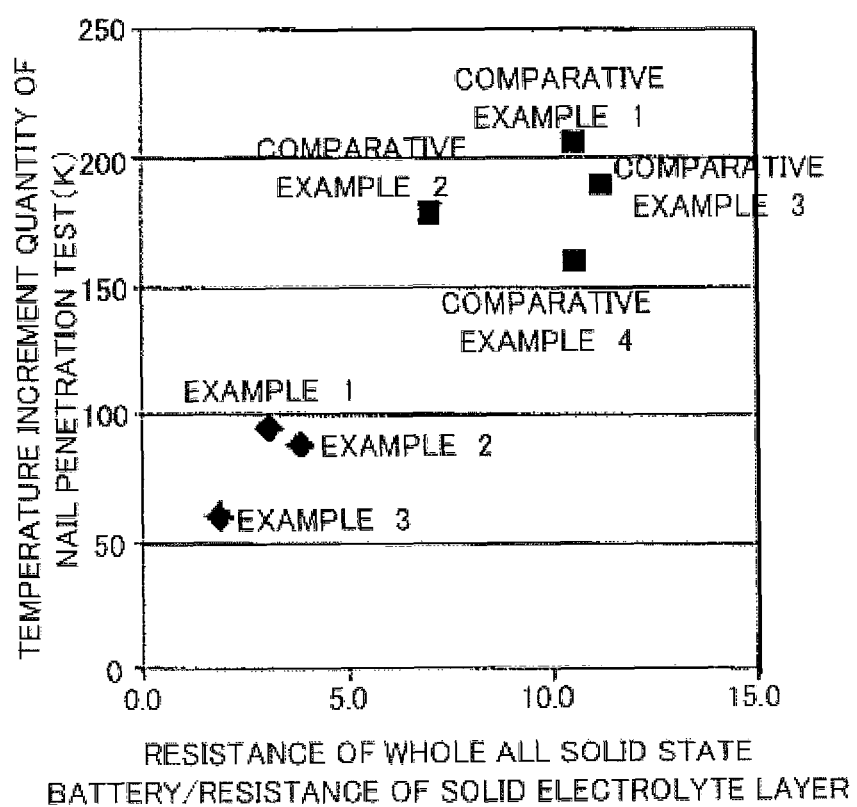
FIG. 4 is a graph showing a result of heating temperature (K) of a nail penetration test in Examples 1 to 3 and Comparative Examples 1 to 4.

Further, as shown in Table 4, FIGS. 3 and 4, it may be confirmed that the laminate batteries of Examples 1 to 3 were high in safety against Joule heating by reason of being small in temperature increment quantity as compared with the laminate batteries of Comparative Examples 1 to 3 and causing no fuming.

Also, as shown in Comparative Example 4, in the case of performing the nail penetration test at an environmental temperature 25° C. as regulatory requirements, the battery having the constitution of Comparative Example 1 was high in temperature increment quantity as compared with Examples 1 to 3 and caused fuming. Accordingly, it may be confirmed that the laminate batteries of Examples 1 to 3 secured safety against Joule heating even in severe environmental temperature.

As explained, compare to Comparative Examples 1 to 3, safety performance was improved while maintaining the battery performance in Examples 1 to 3 (compatibility between battery performance and safety were attained).

REFERENCE SIGNS LIST

1 . . . cathode layer
2 . . . anode layer
3 . . . solid electrolyte layer
4 . . . cathode current collector
5 . . . anode current collector
10 . . . all solid state battery
11 . . . cathode active material
12 . . . anode active material
13 . . . sulfide solid electrolyte material
10 . . . all solid state battery

What is claimed is:

1. An all solid state battery comprising a cathode layer containing a cathode active material, an anode layer containing an anode active material, and a solid electrolyte layer formed between the cathode layer and the anode layer, containing a first sulfide solid electrolyte material;
   wherein a ratio of ion resistance of the whole all solid state battery to ion resistance of the solid electrolyte layer is 3.8 or less, and the ion resistance of the solid electrolyte layer is 7.6 $\Omega \cdot cm^2$ or more and 16 $\Omega \cdot cm^2$ or less.

2. The all solid state battery according to claim 1, wherein at least one of the cathode layer and the anode layer further contains a second sulfide solid electrolyte material.

3. The all solid state battery according to claim 2, wherein the first sulfide solid electrolyte material and the second sulfide solid electrolyte material are different materials.

4. The all solid state battery according to claim 2, wherein an ion conductance of the second sulfide solid electrolyte material is larger than an ion conductance of the first sulfide solid electrolyte material.

\* \* \* \* \*